852/101

United States Patent Office 3,023,138 Patented Feb. 27, 1962

3,023,138
POWDERLESS ETCHING BATH AND METHOD OF ETCHING PLATES THEREWITH

John A. Easley, Midland, and Marvin H. Fishaber, Saginaw, Mich., assignors to The Dow Chemical Company, Midland, Mich., a corporation of Delaware No Drawing. Filed June 12, 1959, Ser. No. 819,821
9 Claims. (Cl. 156—14)

This invention relates to a method of etching metal. More particularly it relates to an improved method and bath for etching photoengraving plates, name plates, metal patterns and the like.

In the conventional method of making such objects as, for example, a photoengraving plate, a flat or cylindrical plate of an acid-soluble metal such as magnesium zinc or one of their alloys is coated with a light-sensitive coating or "enamel." After coating, the surface is exposed to light through a negative having an image thereon so as to produce an image on the coating. Next, the exposed surface is developed forming an acid-resistant coating in the form of the image produced by the exposure. This acid-resistant coating is generally further hardened by heating and the final acid-resistant image is called the "resist." The image-bearing surface of the plate is then subjected to etching by an acid to produce the image in relief. It is necessary in carrying out the etching process that techniques be employed to reduce lateral etching which undercuts the resist and/or relief sidewalls causing a weakening, distortion, or complete loss of the image. A common method in the art for minimizing this lateral etching consists of powdering the sides of the relief with an acid-resistant etching powder. This is a difficult and time-consuming operation which must be repeated a number of times for each plate.

Recent inventions such as are disclosed in U.S. Patents 2,640,765, 2,640,767 and 2,828,194 propose etching baths which permit powderless etching. Essentially most powderless etching baths comprise an acid, a filming agent and a water-immiscible organic fluid. The combination of the filming agent and the water immiscible organic fluid must have selective filming tendencies, i.e., acid-resistant films must be formed on relief sidewalls to prevent lateral etching but in adjacent resist-free areas where etching is necessary in a direction normal to the surface of the plate under the conditions of bath application, films should be absent. Some etching bath characteristics of prime importance are; capacity to achieve proper printing depths in the different parts of combination photoengraving plates, minimization of lateral etching, bath chemical stability and less criticality in the concentration ranges of bath components. In each of these characteristics the present invention gives excellent performance.

A particularly challenging problem in the powderless etching art has been the difficulty in obtaining proper depths in different parts of the plate being etched, e.g., line and halftone images on combination plates. Desirable depths of etch vary somewhat but depths of 0.02 inch in open line areas and 0.005 inch in 65 line screen halftone areas are generally satisfactory. Another problem, chemical stability, has two aspects, namely, depletion and deterioration. In the event of depletion as when nitric acid is used up in etching the metal, more of the chemical can be added to reactivate the bath. This can be repeated a number of times until the presence of excessive nitrate salts has such a depreciating effect that the bath must be discarded. A more serious problem is posed by chemical deterioration as a function of time, which occurs due to the reactivity of bath components, particularly the filming agent with dilute nitric acid. Bath formulations with such a defect have short periods of effectiveness during which peak results can be obtained in consecutive applications.

It is a principal object of this invention to provide an improved etching bath for use with metal photoengraving plates and to provide an etching bath capable of producing proper depths of etch in different kinds of image areas on the same plate. A further object is to provide a chemically stable bath. Still another object is to provide an improved etching bath for producing name plates, metal patterns, templates and the like. Other objects will become apparent hereinafter.

Such objects are accomplished by an etching bath which includes (A) acid; (B) organic water-immiscible fluid stable in the presence of dilute acids; (C) substituted halogenated diaryloxide sulfonate wherein the substituents on halogenated diaryloxide sulfonates are hydrophobic groups containing up to 30 carbon atoms, and (D) water.

Bath additives and the amounts required are described in more detail below. Since the baths are usually made up to a stated volume, the units employed to designate amounts, as a matter of convenience, are on the basis of grams per liter of bath. Note quantities of nitric acid are on the basis of 100 percent nitric acid, unless otherwise specified.

The acid additive is generally nitric acid although the inclusion of small amounts of sulfuric acid, hydrochloric acid, acetic acid and the like with nitric acid has been found to be beneficial in some baths. Operable amounts of nitric acid range from 30 to 200 grams per liter of bath but a preferred range is from 50 to 150 grams per liter of bath. A desired range is from 60 to 140 grams per liter of bath.

A second additive is an organic, water-immiscible fluid which may be a single compound or blend of such compounds. Required properties of this additive are that it be substantially stable in the presence of dilute nitric acid, at bath temperatures, and that it have some solvency for the substituted diaryloxide sulfonate. Substantially stable is defined as the non-occurrence of deterioration, within a reasonable time period due to the presence of dilute nitric acid which significantly alters the function of the organic water-immiscible component within the bath in an unfavorable manner. Also it is essential that this additive is a liquid at bath temperatures. Suitable organic materials which can be used individually or in combination are hydrocarbon aromatics, aliphatics and naphthenics boi'ing from 90° to 390° C., as for example, ligroin, kerosene, gas oils, diethylbenzenes, tetramethylbenzenes, diisopropylbenzenes, and dodecylbenzenes. Other examples of water-immiscible fluids include turpentine, monochloroethylbenzene, ethylbutyl ketone, isophorone, methylhexyl ketone, d-limonene, diisodecyl, phthalate, hexylacetate and the like. Generally, it may be said that water-immiscible esters, ketones, terpenes, ethers, aliphatic, naphthenic and aromatic hydrocarbons are operable. Certain commercial solvents also serve very effectively as this component of the bath. An example is a commercial aromatic solvent under a trade name of Penola H.A.N. which contains 84 percent aromatics, has a flash point of 140° F., an aniline point of minus 2° F., and a distillation temperature range at 760 mm. Hg: initial boiling point of 340° F., 50 percent distilled at 446° F. and dry point at 532° F. Another commercial aromatic solvent employed has the trade name Solvesso 150 which is a mixture of approximately 90 percent alkyl benzenes, 2 percent naphthalene and 8 percent naphthenes. It has a flash point of 150° F., an aniline point of minus 18° F., and a distillation temperature range at 760 mm. Hg: initial boiling point of 303° F., 50 percent distilled at 378° F. and dry point at 415° F. The amounts of the water-immiscible organic fluid employed may range from 3 to 150 grams per liter of bath but a preferred range is from 5 to 100 grams per liter of bath. A desired range is 10 to 60 grams per liter of bath.

A third bath additive is a hydrophobic-hydrophilic filming agent such agent being a compound or blend of compounds, which may be characterized by the formula:

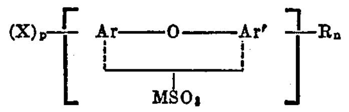

wherein the enclosed molecular nucleus represents a diaryloxide in which Ar and Ar′ are selected from a group consisting of phenyls and naphthyls, to which nucleus is appended from 1 to 3 sulfonic groups, X is a halogen, *p* is an integer from 1 to 3, R is a hydrophobic substituent containing up to 30 carbon atoms, *n* is an integer from 1 to 8 with a limitation being that the total carbon atoms of the entire compound does not exceed 50 and M is hydrogen or a hydrogen displaceable ion.

The foregoing nucleus containing an ether linkage and 1 to 3 sulfonic acid radicals in any ring position is strongly hydrophilic. An ideal balance between the hydrophilic and hydrophobic properties of the entire molecule is achieved by the substitution on the aryl rings of one or more hydrophobic hydrocarbons and one or more halogens. The hydrophobic hydrocarbon substituents may be connected to the diaryloxide by means of ether, amide, ester or carbon to carbon linkages. Likewise, within the substituent hydrophobic group itself there may be similar chemical linkages so long as it is essentially hydrophobic. However, the hydrophobic aryl ring substituents and more importantly the entire molecule itself must retain its hydrophobic-hydrophilic balance for at least several hours in the presence of dilute nitric acid as employed in this invention. Another overall limitation upon the filming agent is that it must be totally soluble in the bath and present to some extent in both bath phases, i.e., the aqueous nitric acid solution and the organic water-immiscible fluid.

A preferred example of a substituted halogenated diaryloxide sulfonate may be characterized by the formula:

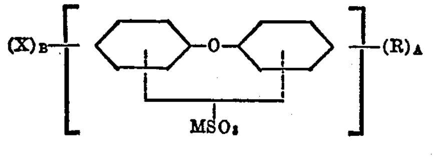

wherein R is an alkyl containing from 1 to 30 carbon atoms, A is an integer from 1 to 8, a limitation being that the total carbon atoms of all substituted alkyls is no less than 4 and does not exceed 30, X is a halogen and B is an integer from 1 to 2. It is to be understood by the foregoing language that there is always at least one alkyl substituent and when more than one, the alkyl substituents may contain the same or different numbers of carbon atoms. The preferred form of the foregoing compound contains one sulfonic radical but more than one sulfonic radical may be present in a compound so long as such a compound is a minor proportion of the filming agent. Whatever constitutes M is unimportant so long as it is hydrogen or a salt-forming ion capable of being displaced by hydrogen in the dilute aqueous nitric acid of the bath. Suitable materials for M in addition to hydrogen are the alkali metals, alkaline earth metals (defined as including magnesium), ammonium and substituted ammnoium radicals. The means of diagramming the sulfonic acid groups indicates immateriality as to which ring group they are attached.

It is believed that in forming a film the polar part of the filming molecule attaches to the metal surface while the hydrophobic non-polar segment of the molecule, having an affinity for the organic water-immiscible fluid or, as it is sometimes called, the solvent, draws such atoms to it, thereby perfecting a substantially acid-resistant film. By virtue of the objects to be accomplished, the bath of this invention must have selective filming tendencies under the conditions present as the etching process is carried out, i.e., acid-resistant films must be formed and retained upon the side walls of the relief but adjacent resist-free areas must be susceptible to the etching action of the nitric acid in a direction normal to the surface of the plate being etched.

Some substituted diaryloxide sulfonic acids and their salts which can be produced in a halogenated form as employed in the present invention are described in United States Patent 2,081,876. Other chlorinated alkylated diaryloxides are described in a copending application entitled "Alkylated Chlorinated Diaryloxide Sulfonate Acids and Their Salts," Serial No. 735,681, filed May 16, 1958 and now abandoned. Others may be by-products of the methods disclosed therein. Amounts of this filming agent to be employed may range from 0.5 to 20 grams per liter of bath but a preferred range is from 0.9 to 8 grams per liter of bath. Desirably, 1.6 to 5.0 grams per liter are employed.

Water constitutes the remaining essential component of the bath. It is to be noted, however, that in some baths there may be other materials present, particularly by-producs from the production of the foregoing components. Alternatively, other materials which enhance a particular effect may be employed.

In the practice of the present invention, it has been found to be desirable to impinge the bath upon the surface to be etched as by spraying or by splashing. In the formulation of the etching bath, it has been found to be a general rule that as the concentration of the nitric acid is increased within the aforementioned limitations, it is necessary to also increase the proportion of filming agent employed. However, due to bath depletion as the etching process is carried out, it is better to designate amounts of components in terms of their initial concentrations.

Suitable metals which may be etched by this process include zinc, zinc base alloys, magnesium and magnesium base alloys all of which are substantially homogeneous metals suitable for photoengraving. A zinc or magnesium base alloy is defined as having at least 70 percent of the base component. The average bath temperature may be within a range from 40° to 120° F., but a preferred range is from 60° to 90° F.

A preferred embodiment of this invention comprises nitric acid in an amount from about 90 to 120 grams per liter of bath, diethylbenzene (a mixture of the isomers) in an amount from about 20 to 70 grams per liter of bath and sodium monochlorododecyl diphenyloxide sulfonate of at least 80 percent of the para isomer

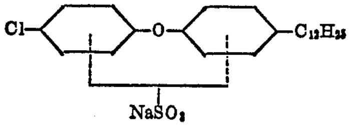

and not more than 20 percent of the ortho isomer,

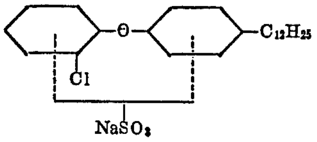

in an amount from 3 to 7 grams per liter of bath, preferably 4 to 6 grams per liter of bath. The remainder of the mixture is water.

To carry out the etching process, it is preferred to employ an etching machine of the type disclosed in U.S. Patent No. 2,669,048, issued February 16, 1954. In this "Dow Etch" machine, rotating elongated paddles intermittently splash the etching bath upwardly against the image-bearing surface of the object being etched. The splashing action of the paddles also serves to keep the bath in a homogeneous state. A bath of this invention applied in the described manner for about 10 minutes will usually produce depths of etch from approximately 0.025 to 0.035 inch in line areas of the plate while producing proper depths in various other parts of the plate. Also, etch factors in line image areas from 30–50 are readily obtainable. Etch factor as used in this specification is defined as the ratio of the depths of the etch adjacent to a line of resist divided by one-half of the loss in width of metal immediately beneath the resist. It is obviously desirable to have as high etch factors as possible for faithful reproduction of the image in relief, however, it should be noted that the etch factor can be sensitive to changes in depth. Thus, it should be considered as only one rough approximation of etching bath quality. The foregoing bath also has very good chemical stability as a function of time since it is capable of producing uniform and good results on consecutive plates over periods of many hours.

The following examples are intended to be merely illustrative of the invention and should not be construed as limitations on the scope of invention.

EXAMPLE 1

A powderless etching bath of 6.0 liters was prepared in a miniature "Dow Etch" machine by adding 1008 grams of 42° Baumé nitric acid, 150 grams of diethylbenzene (a mixture of the isomers), and 30 grams of sodium monochlorododecyl diphenyloxide monosulfonate containing at least 80 percent of the para isomer,

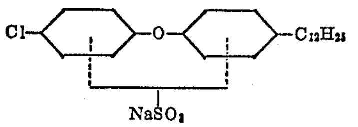

and not more than 20 percent of the ortho isomer

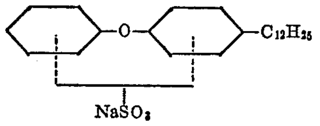

The remainder of the bath was water. Addition of the filming agent monochlorododecyl diphenyloxide monosulfonate was conveniently accomplished by first dissolving or dispersing it in a small amount of water and then adding the resulting solution to the bath. Bath temperature was adjusted to about room temperature, approximately 72° F. A plate approximately 5" x 5" x .064" of a magnesium base alloy containing approximately 3 percent Al, 1 percent Zn and trace amounts of impurities, having a polyvinyl alcohol resist thereon was descummed by brushing the surface with dilute nitric acid until the surface was bright.

The plate was then placed in the machine, the paddles turned on and etching allowed to continue for 6 minutes. The depth of etch in line areas was about .018 inch and in 65 line screen halftone areas the depth was about .005 inch. The etch factor in the line area was approximately 25.

EXAMPLES 2–20

In a similar manner to that of the foregoing example, other tests were made as reported in the following tabulated data.

Pertinent definitions of symbols found in Table I are:

Alloys:
- "A"=A Mg base alloy rolled sheet containing 3 percent Al and 1 percent Zn and trace amounts of impurities having been given no solution heat treatment after final rolling.
- "B"=The same alloy composition as "A" that has been solution heat treated for approximately one hour at 600° F.
- "C"=A Zn base alloy rolled sheet containing less than 1 percent Mg and less than 1 percent Al.
- "D"=A Mg base alloy rolled sheet containing 2.6 percent Zn.
- "E"=A Mg base alloy rolled sheet containing 1 percent Zn and 0.2 percent Mn.

Organic immiscible fluids:
- "Penola H.A.N."=A commercial aromatic solvent containing 84 percent aromatics, having a KB of 97, an aniline point of minus 2° F., a flash point of 140° F. and a distillation temperature range at 760 mm. Hg: initial boiling point of 340° F., 50 percent distilled at 446° F. and a dry point at 532° F.
- "Solvesso 150"=A commercial aromatic solvent containing aromatics (alkyl benzenes) 90 percent, naphthalene 2 percent, naphthenes 8 percent, having a KB of 87, an aniline point of minus 18° F., a flash point of 150° F. and a distillation range at 760 mm. Hg: initial boiling point of 363° F., 50 percent distilled at 378° F. and a dry point of 415° F.

Filming agents:
- "W"=Sodium monochloro dodecyl diphenyloxide monosulfonate
- "X"=Sodium monochloro nonyl diphenyloxide monosulfonate
- "Y"=Sodium monochloro pentadecyl diphenyloxide monosulfonate Wherever a concentration range is omitted, the concentration employed is that given under the optimum column. The nitric acid concentrations stated are initial concentrations and in some instances optimum results were achieved after several plates had been etched; therefore, the actual nitric acid concentration at the time of optimum results may be less than the initial nitric acid concentration. Also all baths except for examples numbered 19 and 20 were made up to a volume of 6.0 liters and employed in a miniature "Dow Etch" machine as in Example 1. The excepted baths 19 and 20 were made up to a volume of 134 liters and employed in a commercial size "Dow Etch" machine. Also, larger plates were used, e.g., 18" x 24" x .064", but in other respects such examples were run in a similar manner to that of the foregoing smaller baths. Concentrations of bath additives are expressed as grams per liter of bath.

chlorooctadecyl diphenyl oxide,
chlorohexadecyl diphenyl oxide,

*Table I*

| Filming agent: Compound | Filming agent: Gm./l. of bath, Range | Filming agent: Gm./l. of bath, Opt. | Organic immiscible liquid: Compound | Organic immiscible liquid: Gm./l. of bath, Range | Organic immiscible liquid: Gm./l. of bath, Opt. | Initial $HNO_3$: Gm./l. of bath as 42° Bé. | Initial $HNO_3$: as $HNO_3$ | Plate alloy | Etch conditions: Time, min. | Etch conditions: Temp. of bath, ° F. | Etch results: Line area depth (inches) | Etch results: Halftone 65 screen depth (inches) | Etch results: Etch factor (in line area) |
|---|---|---|---|---|---|---|---|---|---|---|---|---|---|
| 2. W | ---------- | 3.3 | Monochloro-ethylbenzene | -------- | 15 | 168 | 118 | A | 8.0 | 75 | 0.021 | 0.005 | 25+ |
| 3. W | ---------- | 5.0 | Isophorone | -------- | 10 | 168 | 118 | A | 8.0 | 75 | 0.020 | 0.0065 | 20+ |
| 4. W | 3.3–4.2 | 4.2 | Dodecylbenzene | 10–50 | 50 | 140 | 98 | A | 12.0 | 75 | 0.026 | 0.0045 | 40+ |
| 5. W | ---------- | 4.2 | Diethylbenzene | -------- | 50 | 140 | 98 | A | 12.0 | 75 | 0.028 | 0.0045 | 40+ |
| 6. W | ---------- | 2.6 | Penola H.A.N.<br>+<br>Diisodecylphthalate | --------<br><br>-------- | 20<br><br>10 | 168 | 118 | A | 12.0 | 75 | 0.030 | 0.005 | 40+ |
| 7. W | 1.7–2.5 | 2.5 | Dicapryl adipate | 10–20 | 20 | 140 | 98 | A | 6.0 | 75 | 0.014 | 0.005 | 25+ |
| 8. W | ---------- | 5.8 | Solvesso 150 | 10–30 | 30 | 140 | 98 | A | 6.0 | 75 | 0.016 | 0.005 | 20+ |
| 9. W | 5–6.7 | 6.7 | Methylhexylketone | -------- | 15 | 168 | 118 | A | 8.0 | 75 | 0.020 | 0.007 | 20 |
| 10. W | ---------- | 4.1 | d-Limonene | 10–50 | 50 | 168 | 118 | A | 8.0 | 72 | 0.022 | 0.004 | 20 |
| 11. W | ---------- | 3.3 | Solvesso 150 | -------- | 10 | 168 | 118 | D | 8.0 | 75 | 0.024 | ---------- | 40+ |
| 12. W | ---------- | 1.7 | Dodecyl-benzene | -------- | 30 | 168 | 118 | B | 6.0 | 75 | 0.018 | 0.005 | 25+ |
| 13. W | 0.8–0.9 | 0.9 | Penola H.A.N.<br>+<br>Diisodecylphthalate<br>+<br>Dodecylbenzene | --------<br><br>--------<br><br>-------- | 10<br><br>5<br><br>2.5 | 168 | 118 | E | 11.0 | 72 | 0.025 | 0.0055 | 50+ |
| 14. W | ---------- | 1.1 | Penola H.A.N.<br>+<br>Diisodecylphthalate | --------<br><br>-------- | 10<br><br>5 | 168 | 118 | E | 6.0 | 73 | 0.018 | 0.0075 | 50+ |
| 15. W | 4.1–5.0 | 5.0 | Solvesso 150 | 10–30 | 30 | 168 | 118 | C | 7.0 | 72 | 0.011 | 0.0045 | 50+ |
| 16. X | ---------- | 3.3 | Diethylbenzene | 40–80 | 80 | 168 | 118 | A | 7.0 | 72 | 0.020 | 0.0045 | 50+ |
| 17. Y | 1.6–3.7 | 3.7 | do | -------- | 40 | 168 | 118 | A | 10.0 | 72 | 0.027 | 0.005 | 50 |
| 18. W | ---------- | 3.3 | do | -------- | 40 | 168 | 118 | A | 5.0 | 72 | 0.014 | ---------- | 10 |
| 19. W | ---------- | 3.5 | Solvesso 150 | -------- | 40 | 140 | 98 | B | 11.0 | 75 | 0.033 | 0.003 | 30 |
| 20. W | ---------- | 2.3 | Solvesso 150<br>+<br>Diisodecylphthalate | --------<br><br>-------- | 22.4<br><br>16 | 167 | 117 | A | 8.0 | 75 | 0.032 | 0.006 | 30 |

EXAMPLE 21

In a manner similar to that of Example 1, a powderless etching bath of 6 liters was prepared from 1008 grams of 42° Baumé nitric acid, 150 grams of diisodecylphthalate, 252 grams of Solvesso 150, 5 grams of a polyethylene glycol having an average molecular weight of 2050 (polyethylene glycol being used to obtain better emulsification of the bath) and 28 grams of sodium monochlorododecyl diphenyloxide sulfonate.

A total of nine photoengraving plates similar to that described in Example 1 were etched. After the ninth plate, the acid was replenished by adding 144 grams of nitric acid and the next plate was etched for 10 minutes at a bath temperature of 75° F. The resulting good quality plate had depths of etch of 0.031 inch in line areas and 0.005 inch in 65 line screen halftone areas with a minimum of lateral etching in all areas.

This bath was then allowed to stand overnight and the next morning, some 16 hours later, a duplicate plate was etched under the same conditions without further additions to the bath. This plate had depths of etch of 0.030 inch in line areas and 0.005 inch in 65 line screen halftone areas and was nearly qualitatively identical to the plate etched on the previous day.

In a like manner to that of the foregoing examples, comparable results are achieved with a powderless etching bath in which the following substituted halogenated diaryloxide sulfonic acids or their salts are substituted for the specific film forming agents shown in the foregoing example such as the sulfonic acid isomers of chloropentyl dinaphthyl oxide,
chlorohexyl dinaphthyl oxide,
chloroheptyl dinaphthyl oxide,
chlorooctyl dinaphthyl oxide,
chlorononyl naphthyl-phenyl oxide,
chlorodecyl naphthyl-phenyl oxide,
chloroundecyl naphthyl-phenyl oxide,
chlorododecyl diphenyl oxide,
chlorotridecyl diphenyl oxide,
chlorotetradecyl diphenyl oxide,
chloropentadecyl diphenyl oxide,
chlorohexadecyl diphenyl oxide,
chloroheptadecyl diphenyl oxide,
chloroheptadecyl diphenyl oxide,
chlorononadecyl diphenyl oxide,
chloroeicosyl diphenyl oxide,
chloroheneicosyl diphenyl oxide,
chloropentyloxy dinaphthyl oxide,
chlorohexyloxy dinaphthyl oxide,
chloroheptyloxy dinaphthyl oxide,
chlorooctyloxy dinaphthyl oxide,
chlorononyloxy naphthyl-phenyl oxide,
chlorodecyloxy naphthyl-phenyl oxide,
chloroundecyloxy naphthyl-phenyl oxide,
chlorododecyloxy diphenyl oxide,
chlorotridecyloxy diphenyl oxide,
chlorotetradecyloxy diphenyl oxide,
chloropentadecyloxy diphenyl oxide,
chlorohexadecyloxy diphenyl oxide,
chloroheptadecyloxy diphenyl oxide,
chlorooctadecyloxy diphenyl oxide,
chlorononadecyloxy diphenyl oxide,
chloroeicosyloxy diphenyl oxide,
chloroheneicosyloxy diphenyl oxide,
chlorovaleramido dinaphthyl oxide,
chlorohexanamido dinaphthyl oxide,
chlorooctanamido dinaphthyl oxide,
chloroheptanamido dinaphthyl oxide,
chlorononanamido naphthyl-phenyl oxide,
chlorodecanamido naphthyl-phenyl oxide,
chloroundecanamido naphthyl-phenyl oxide,
chlorododecanamido diphenyl oxide,
chlorotridecanamido diphenyl oxide,
chlorotetradecanamido diphenyl oxide,
chloropentadecanamido diphenyl oxide,
chlorohexadecanamido diphenyl oxide,
chloroheptadecanamido diphenyl oxide,
chlorooctadecanamido diphenyl oxide,
chlorononadecanamido diphenyl oxide,
chloroeicosanamido diphenyl oxide,
chloroheneicosanamido diphenyl oxide,
chlorovaleryloxy dinaphthyl oxide,
chlorohexanoyloxy dinaphthyl oxide,
chloroheptanoyloxy dinaphthyl oxide,
chlorooctanoyloxy dinaphthyl oxide,
chlorononanoyloxy naphthyl-phenyl oxide,
chlorodecanoyloxy naphthyl-phenyl oxide, chloroundecanoyloxy naphthyl-phenyl oxide,
chlorododecanoyloxy diphenyl oxide,
chlorotridecanoyloxy diphenyl oxide,
chlorotetradecanoyloxy diphenyl oxide,
chloropentadecanoyloxy diphenyl oxide,
chlorohexadecanoyloxy diphenyl oxide,
chloroheptadecanoyloxy diphenyl oxide,
chlorooctadecanoyloxy diphenyl oxide,
chlorononadecanoyloxy diphenyl oxide,
chloroeicosanoyloxy diphenyl oxide,
chloroheneicosanoyloxy diphenyl oxide
and the like.

Others are the sulfonic acids or salts thereof of the isomers of iododiisopropyl dinaphthyl oxide,
fluorotributyl dinaphthyl oxide,
chlorodipentadecyl dinaphthyl oxide,
dichlorotridecyl dinaphthyl oxide,
trichlorodiethyl dinaphthyl oxide,
bromooctamethyl dinaphthyl oxide,
dibromotetramethyl dinaphthyl oxide,
bromotetraethyl naphthyl-phenyl oxide,
diiodotriheptyl naphthyl-phenyl oxide,
trichlorotetramethyl naphthyl-phenyl oxide,
difluorododecyl naphthyl-phenyl oxide,
diiododioctyl naphthyl-phenyl oxide,
fluorodiheptyldecyl naphthyl-phenyl oxide,
fluorotetraethyl diphenyl oxide,
difluorodioctyl diphenyl oxide,
trifluorodiethyl diphenyl oxide,
chlorodinonadecyl diphenyl oxide,
dichloroeicosyl diphenyl oxide,
trichlorodibutyl diphenyl oxide,
bromooctamethyl diphenyl oxide,
dibromotetraethyl diphenyl oxide,
tribromodibutyl diphenyl oxide,
iodohexadecyl diphenyl oxide,
diiodododidecyl diphenyl oxide,
triiodotetraheptyl diphenyl oxide,
iodooctyloxy dinaphthyl oxide,
diiodopentyloxy dinaphthyl oxide,
diiodovaleramido dinaphthyl oxide,
triiodoheptanoyloxy dinaphthyl oxide,
bromononamido naphthyl-phenyl oxide,
bromodecanoyloxy naphthyl-phenyl oxide,
dibromotridodecanoyloxy naphthyl-phenyl oxide,
dichlorodidecyloxy naphthyl-phenyl oxide,
dichlorotetrahexyloxy dinaphthyl oxide,
iodooctadecyloxy naphthyl-phenyl oxide,
difluorotetrahexanamido naphthyl-phenyl oxide,
diiodononadecanamido naphthyl-phenyl oxide,
fluorodiheptadecanamido diphenyl oxide,
difluorotridecyloxy diphenyl oxide,
chloroeicosyloxy diphenyl oxide,
dichlorodidecyloxy diphenyl oxide,
dichlorotetradecylanoyloxy diphenyl oxide,
trichlorooctadecanoyloxy diphenyl oxide
and the like.

In a similar manner to that of the foregoing examples, comparable results may be achieved when the foregoing etching baths are employed to produce such objects as metal name plates, metal patterns and metal templates.

Various modifications may be made in the etching bath and method of applying such bath without departing from the spirit and scope of the invention and it is understood that we limit ourselves only as defined in the appended claims as read in the light of the specification.

We claim:

1. An etching bath comprising (A) 30 to 200 grams per liter of bath of nitric acid; (B) 3 to 150 grams per liter of bath of a water-immiscible organic fluid substantially stable in the presence of dilute nitric acid; (C) 0.5 to 20 grams per liter of bath of a substituted hydrophobic-hydrophilic filming agent characterized by the formula

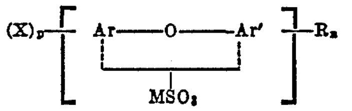

wherein the enclosed molecular nucleus represents a diaryloxide in which Ar and Ar′ are selected from a group consisting of phenyl and naphthyl to which nucleus is appended from 1 to 3 sulfonic groups, R is a hydrophobic substituent having up to 30 carbon atoms, $n$ is an integer from 1 to 8, a limitation being that the number of carbon atoms in the entire compound does not exceed 50, X is a halogen, $p$ is an integer from 1 to 3 and M is a hydrogen displaceable ion; and (D) water.

2. An etching bath comprising (A) 30 to 200 grams per liter of bath of nitric acid; (B) 3 to 150 grams per liter of bath of a water-immiscible organic fluid substantially stable in the presence of dilute nitric acid; (C) 0.5 to 20 grams per liter of bath of a substituted hydrophobic-hydrophilic filming agent characterized by the formula

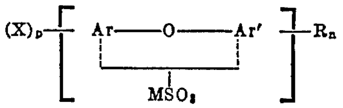

wherein the enclosed molecular nucleus represents a diaryloxide in which Ar and Ar′ are selected from a group consisting of phenyl and naphthyl to which nucleus is appended from 1 to 3 sulfonic groups, R is a hydrophobic substituent having up to 30 carbon atoms, $n$ is an integer from 1 to 8, a limitation being that the number of carbon atoms in the entire compound does not exceed 50, X is a halogen, $p$ is an integer from 1 to 3 and M is a hydrogen displaceable ion, such filming agent being soluble in the etching bath with partial solubility in each of the bath phases; and (D) water.

3. An etching bath comprising (A) 30 to 200 grams per liter of bath of nitric acid; (B) 3 to 150 grams per liter of bath of a water-immiscible organic fluid substantially stable in the presence of dilute nitric acid; (C) 0.5 to 20 grams per liter of bath of a substituted hydrophobic-hydrophilic filming agent characterized by the formula

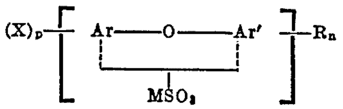

wherein the enclosed molecular nucleus represents a diaryloxide in which Ar and Ar′ are selected from a group consisting of phenyl and naphthyl to which nucleus is appended from 1 to 3 sulfonic groups, R is a hydrophobic substituent having up to 30 carbon atoms, $n$ is an integer from 1 to 8, a limitation being that the number of carbon atoms of the entire compound does not exceed 50, X is a halogen having an atomic number from 17 to 35, $p$ is an integer from 1 to 3 and M is selected from a group consisting of hydrogen, alkali metals, alkaline earth metals, ammonium and substituted ammonium radicals, such filming agent being soluble in the etching bath with partial solubility in each of the bath phases; and (D) water.

4. An etching bath comprising (A) 30 to 200 grams per liter of bath of nitric acid; (B) 3 to 150 grams per liter of bath of a water-immiscible organic fluid substantially stable in the presence of dilute nitric acid; (C) 0.5 to 20 grams per liter of bath of a substituted halogenated diphenyloxide sulfonate characterized by the formula

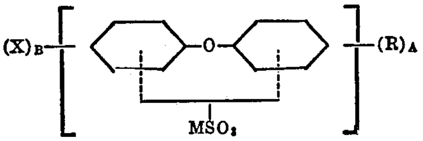

wherein R is alkyl containing from 1 to 30 carbon atoms, A is an integer from 1 to 8, a limitation being that the total carbon atoms of all substituted alkyls is no less than 4 and no more than 30, X is a halogen, B is an integer from 1 to 2, M is a hydrogen displaceable ion, such filming agent being soluble in the etching bath with partial solubility in each of the bath phases; and (D) water.

5. An etching bath comprising (A) 30 to 200 grams per liter of bath of nitric acid; (B) 3 to 150 grams per liter of bath of a water-immiscible organic fluid substantially stable in the presence of dilute nitric acid; (C) 0.5 to 20 grams per liter of bath of a substituted halogenated diphenyloxide sulfonate characterized by the formula

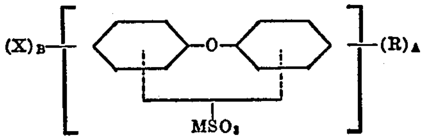

wherein R is alkyl containing from 1 to 30 carbon atoms, A is an integer from 1 to 8, a limitation being that the total carbon atoms of all substituted alkyls is no less than 4 and no more than 30, X is a halogen having an atomic number from 17 to 35, B is an integer from 1 to 2, M is selected from a group consisting of hydrogen, alkali metals, alkaline earth metals, ammonium and substituted ammonium radicals, such filming agent being soluble in the etching bath with partial solubility in each of the bath phases; and (D) water.

6. An etching bath comprising (A) 30 to 200 grams per liter of bath of nitric acid; (B) 3 to 150 grams per liter of bath of a water-immiscible organic fluid substantially stable in the presence of dilute nitric acid; (C) 0.5 to 20 grams per liter of bath of a substituted chlorodiphenyloxide monosulfonate characterized by the formula

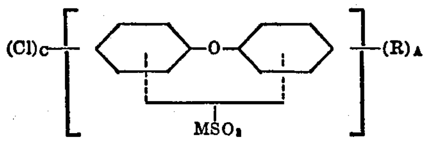

wherein R is alkyl containing from 1 to 30 carbon atoms, A is an integer from 1 to 8, a limitation being that the total carbon atoms of all substituted alkyls is no less than 4 and no more than 30, C is an integer from 1 to 2 and M is selected from a group consisting of hydrogen, alkali metals, alkaline earth metals, ammonium and substituted ammonium radicals; and (D) water.

7. An etching bath comprising (A) 30 to 200 grams per liter of bath of nitric acid; (B) 3 to 150 grams per liter of bath of a water-immiscible organic fluid substantially stable in the presence of dilute nitric acid; (C) 0.5 to 20 grams per liter of bath of an alkylated chlorodiphenyloxide monosulfonate as characterized by the formula

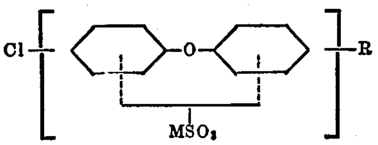

wherein R is an alkyl group having from 9 to 30 carbon atoms and M is selected from a group consisting of hydrogen, alkali metals, alkaline earth metals, ammonium and substituted ammonium radicals; and (D) water.

8. An etching bath comprising (A) 30 to 200 grams per liter of bath of nitric acid; (B) 3 to 150 grams per liter of bath of a water-immiscible organic liquid substantially stable in the presence of dilute nitric acid; (C) 0.5 to 20 grams per liter of bath of a mixture containing at least 80 percent of the para isomer and no more than 20 percent of the ortho isomer of sodium monochloroalkyl diphenyloxide monosulfonate, wherein the alkyl group contains from 8 to 18 carbon atoms with an average of 12 carbon atoms; and (D) water.

9. A method of etching the surface of an acid-soluble metal plate having an acid resistant partial coating thereon, said metal being selected from a group consisting of zinc, zinc base alloys, magnesium and magnesium base alloys which comprises impinging an etching bath upon the metal surface to be etched, such bath comprising (A) nitric acid; (B) a water-immiscible organic fluid substantially stable in the presence of dilute acid; (C) a substituted halogenated diaryloxide sulfonate wherein the substituents on the diaryloxide are selected from a group consisting of hydrophobic hydrocarbons containing from 1 to 30 carbon atoms; and (D) water.

References Cited in the file of this patent

UNITED STATES PATENTS

| | | |
|---|---|---|
| 2,828,194 | Hopkins | Mar. 25, 1958 |
| 2,846,295 | Patterson | Aug. 5, 1958 |
| 2,854,477 | Steinhauer | Sept. 30, 1958 |
| 2,925,332 | Standley | Feb. 16, 1960 |